United States Patent
Stephens et al.

(10) Patent No.: US 7,343,868 B2
(45) Date of Patent: Mar. 18, 2008

(54) SEED PLACEMENT SYSTEM FOR USE IN A SEEDING MACHINE

(75) Inventors: Lyle E. Stephens, Hampton, IL (US); Miles R. Keaton, Rock Island, IL (US); Robert J. Roman, Silvis, IL (US); Jose M. Valdez, Montpeilier, IA (US)

(73) Assignee: Deere & Company, Moline, IL (US)

( * ) Notice: Subject to any disclaimer, the term of this patent is extended or adjusted under 35 U.S.C. 154(b) by 740 days.

(21) Appl. No.: 10/339,920

(22) Filed: Jan. 10, 2003

(65) Prior Publication Data

US 2004/0134399 A1 Jul. 15, 2004

(51) Int. Cl.
*A01C 7/00* (2006.01)
*A01C 9/00* (2006.01)

(52) U.S. Cl. ...................... 111/178; 111/185
(58) Field of Classification Search ........ 111/177–185, 111/170; 221/211, 210, 217; 222/225
See application file for complete search history.

(56) References Cited

U.S. PATENT DOCUMENTS

| 254,957 | A | * | 3/1882 | Grow | 222/314 |
| 729,774 | A | * | 6/1903 | Kralinger et al. | 111/11 |
| 1,097,064 | A | * | 5/1914 | Suggs | 111/59 |
| 1,501,335 | A | * | 7/1924 | Artenstein | 221/217 |
| 1,643,143 | A | * | 9/1927 | Wilcox | 239/668 |
| 2,321,082 | A | * | 6/1943 | Harshberger | 222/225 |
| 2,496,885 | A | * | 2/1950 | Milton | 111/178 |
| 2,535,222 | A | * | 12/1950 | Milton | 222/216 |
| 2,605,023 | A | * | 7/1952 | Ward | 222/623 |
| 2,783,918 | A |   | 3/1957 | Bramblett | 222/177 |
| 2,962,381 | A | * | 11/1960 | Dobry et al. | 427/180 |
| 2,995,274 | A |   | 8/1961 | Haun et al. | 221/211 |

(Continued)

FOREIGN PATENT DOCUMENTS

DE 802 730 2/1951

(Continued)

OTHER PUBLICATIONS

Fundamentals of Machine Operation, Deere & Company, 1981.

*Primary Examiner*—Christopher J. Novosad
(74) *Attorney, Agent, or Firm*—Taylor & Aust, P.C.

(57) ABSTRACT

A seeding machine includes at least one seed metering system and at least one seed placement system. Each seed placement system is in communication with a corresponding seed metering system. Each seed placement system includes a housing having a seed slide, and a wheel at least partly disposed within the housing. The wheel has a circumferential periphery with a plurality of contiguous disc joint surfaces. The periphery is positioned adjacent to at least part of the seed slide. The invention comprises, in another form thereof, a method of placing seeds with a seeding machine in a trench formed in soil. Seeds are received at a predetermined rate at a seed placement system. The seed placement system includes a seed slide, and a wheel having a conferential periphery position closely adjacent to at least part of the seed slide. The seeds are engaged at the predetermined rate against the wheel periphery. The seeds are carried past a closely adjacent area of the seed slide using the wheel periphery. The seeds are released from the wheel periphery.

21 Claims, 4 Drawing Sheets

U.S. PATENT DOCUMENTS

| | | | | |
|---|---|---|---|---|
| 3,048,132 | A | * | 8/1962 | Morgan et al. ............. 111/153 |
| 3,347,426 | A | | 10/1967 | Morrison, Jr. et al. ...... 222/352 |
| 3,348,504 | A | | 10/1967 | Fischer ..................... 111/34 |
| 3,387,746 | A | | 6/1968 | Whipple .................... 221/211 |
| 3,631,825 | A | * | 1/1972 | Weiste ...................... 111/101 |
| 3,636,897 | A | * | 1/1972 | Brink ....................... 111/184 |
| 3,773,224 | A | | 11/1973 | Winslow ................... 222/139 |
| 3,913,503 | A | * | 10/1975 | Becker ...................... 111/77 |
| 4,002,266 | A | | 1/1977 | Beebe | |
| 4,254,987 | A | | 3/1981 | Stocks | |
| 4,264,023 | A | | 4/1981 | Stocks et al. | |
| 4,793,511 | A | * | 12/1988 | Ankum et al. ............. 221/211 |
| 4,896,615 | A | | 1/1990 | Hood, Jr. et al. | |
| 4,924,786 | A | | 5/1990 | Keeton ..................... 111/184 |
| 5,027,725 | A | | 7/1991 | Keeton ..................... 111/184 |
| 5,058,766 | A | | 10/1991 | Deckler .................... 221/254 |
| 5,485,797 | A | * | 1/1996 | Green et al. ............... 111/200 |
| 5,720,233 | A | | 2/1998 | Lodico et al. .............. 111/184 |
| 5,996,515 | A | * | 12/1999 | Gregor et al. .............. 111/174 |
| 6,058,860 | A | * | 5/2000 | Kinkead et al. ............. 111/11 |
| 6,173,664 | B1 | | 1/2001 | Heimbuch ................. 111/178 |
| 6,247,417 | B1 | | 6/2001 | Heimbuch ................. 111/178 |
| 6,308,645 | B1 | * | 10/2001 | Newkirk et al. ............ 111/63 |
| 6,332,413 | B1 | * | 12/2001 | Stufflebeanm et al. ...... 111/170 |
| 6,352,042 | B1 | * | 3/2002 | Martin et al. .............. 111/184 |
| 6,449,804 | B1 | * | 9/2002 | Van Doorn ................ 19/48 R |
| 6,477,967 | B2 | * | 11/2002 | Rosenboom ............... 111/177 |
| 6,581,535 | B2 | * | 6/2003 | Barry et al. ................ 111/181 |
| 2002/0088383 | A1 | | 7/2002 | Berry et al. | |

FOREIGN PATENT DOCUMENTS

FR             2691040      * 11/1993

* cited by examiner

SEED PLACEMENT SYSTEM FOR USE IN A SEEDING MACHINE

FIELD OF THE INVENTION

The present invention relates to agricultural seeding machines, and, more particularly, to seed placement systems used to place seeds along a desired path and at a desired spacing within a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed discs. In the case of a seed disc metering system, a seed disc is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disc to assist in movement of the seeds into the seed cells. The seeds are singulated and discharged at a predetermined rate to the seed placement system.

With a seed metering system including a seed disc as described above, the seed disc typically includes a concentric drive shaft having a sprocket on the outboard end which is driven via a ground drive or the like. The concentrically positioned driven shaft and sprockets may limit the compactness (i.e., reduction in overall size) of the seed metering system.

The seed placement system may be categorized as a gravity drop system or a power drop system. In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls therethrough into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing. For more details of these types of seed placement systems, as well as agricultural planting in general, reference is hereby made to the technical document entitled "PLANTING FUNDAMENTALS OF MACHINE OPERATION"; Breece, Edward H., PhD, et al.; Deere & Co.; 1981, which is incorporated herein by reference.

What is needed in the art is an agricultural seeding machine providing an accurate, efficient and compact seed metering system and seed placement system.

SUMMARY OF THE INVENTION

The present invention provides a seeding machine having a seed placement system with a seed meter and accelerator in the form of a wheel co-acting with a seed slide. The wheel has a gripping outside layer with a plurality of contiguous disjoint surfaces providing a high coefficient of friction for positively carrying the seeds without damaging the seeds. A deflector guides the seeds into the nip between the wheel and the seed slide, and may intermittently deflect the gripping outside layer of the wheel to ensure positive engagement of the seeds with the wheel.

The invention comprises, in one form thereof, a seeding machine including at least one seed metering system and at least one seed placement system. Each seed placement system is in communication with a corresponding seed metering system. Each seed placement system includes a housing having a seed slide, and a wheel at least partly disposed within the housing. The wheel has a circumferential periphery with a plurality of contiguous disjoint surfaces. The periphery is positioned adjacent to at least part of the seed slide.

The invention comprises, in another form thereof, a method of placing seeds with a seeding machine in a trench formed in soil. Seeds are received at a predetermined rate at a seed placement system. The seed placement system includes a seed slide, and a wheel having a circumferential periphery positioned closely adjacent to at least part of the seed slide. The seeds are engaged at the predetermined rate against the wheel periphery. The seeds are carried past a closely adjacent area of the seed slide using the wheel periphery. The seeds are released from the wheel periphery.

An advantage of the present invention is that the wheel meters and accelerates the seeds in a positive manner.

Another advantage is that the bristles at the circumferential periphery of the wheel positively engage the seeds and carry the seeds past the seed slide, regardless of the size and orientation of the seeds.

Yet another advantage is that the gripping outside layer at the circumferential periphery of the wheel may take the form of several different materials having a high coefficient of friction, such as bristles, a foam pad, an expanded foam pad, a mesh pad, a fiber pad and a grit layer.

A further advantage is that the housing partially surrounding the wheel for directing the seeds past the wheel is simply and effectively defined by the seed slide and a pair of side plates.

A still further advantage is that the deflector may intermittently deflect the gripping outside layer of the wheel to ensure positive engagement with the seeds.

DETAILED DESCRIPTION OF THE INVENTION

Figure 1:
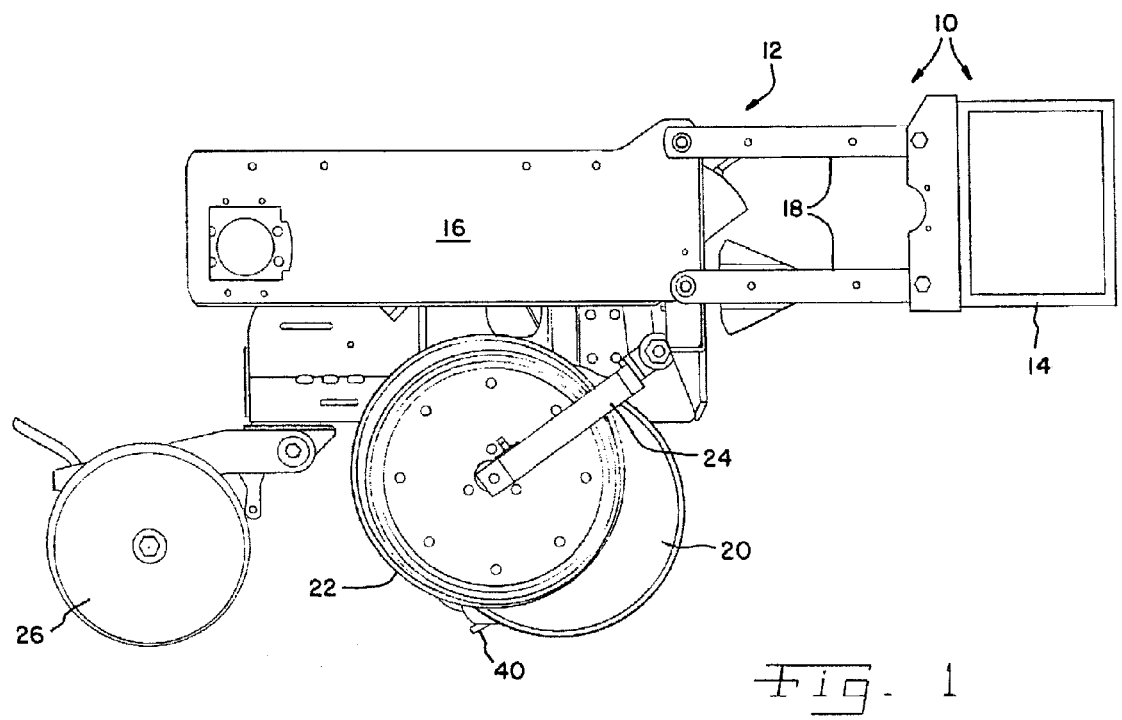
FIG. 1 is a side view of an embodiment of a seeding machine of the present invention including a row crop unit.
Figure 2:
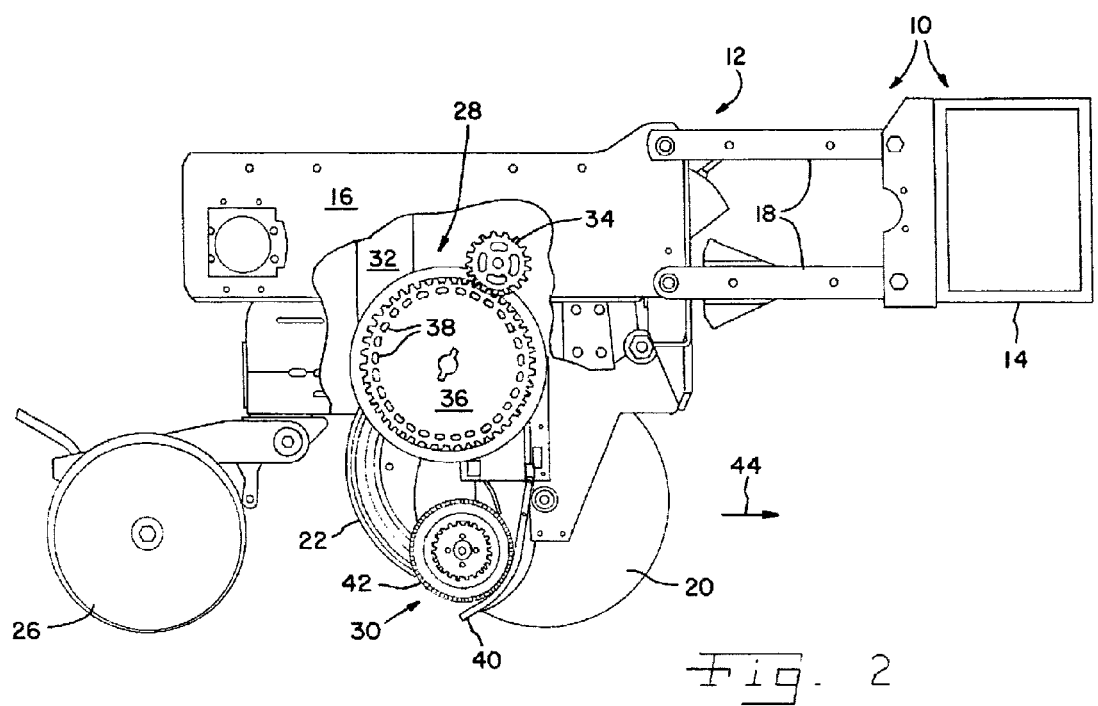
FIG. 2 is a partially fragmentary, side view of the row crop unit shown in FIG. 1, illustrating the internal components of the seed metering system and seed placement system.
Figure 3:
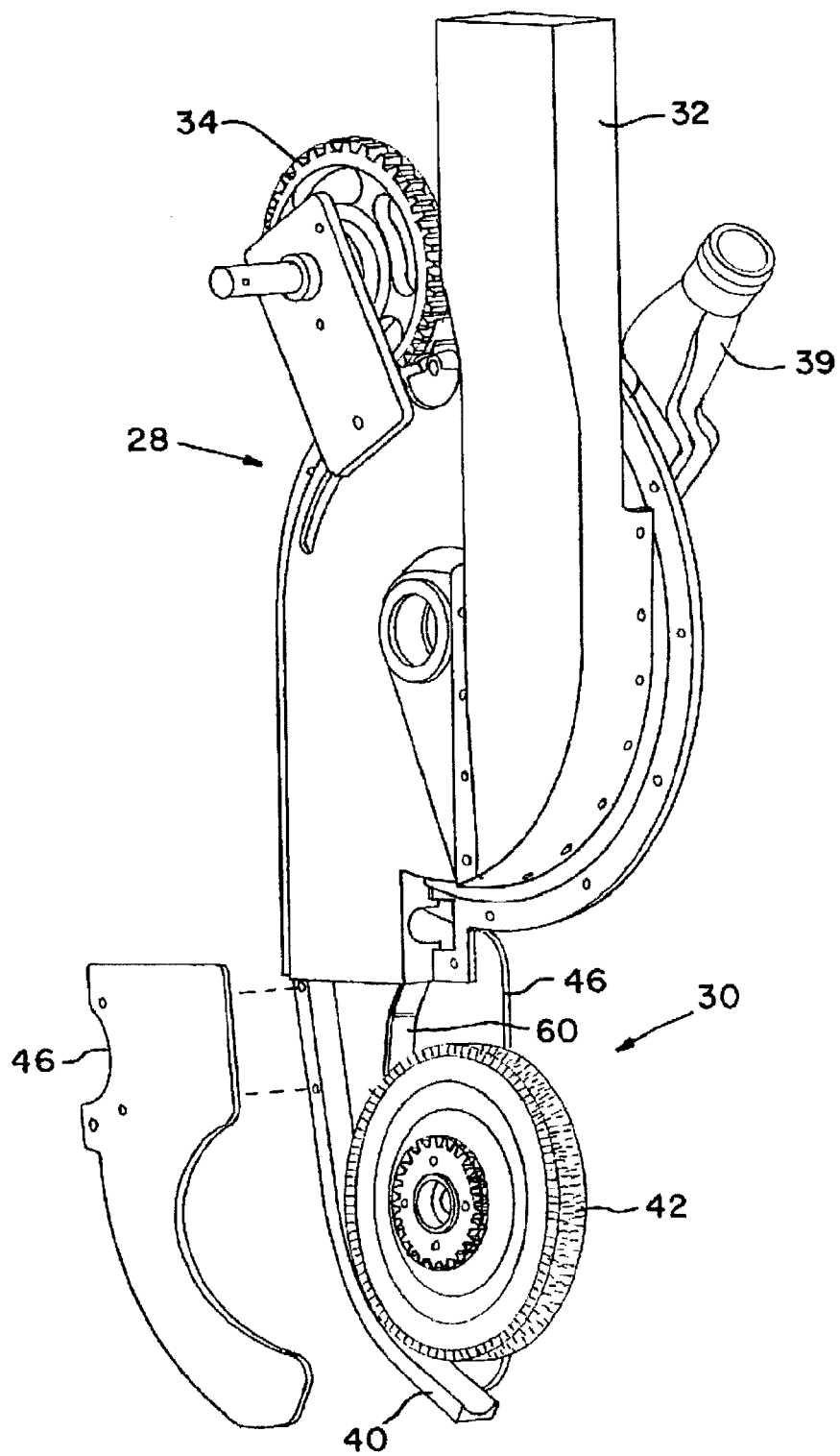
FIG. 3 is a perspective view of the seed metering system and seed placement system shown in FIG. 2, with one of the side plates removed to show the wheel and seed slide.

Referring now to the drawings, and more particularly to FIGS. 1 and 2, there is shown an embodiment of a seeding machine 10 of the present invention. In the embodiment shown, seeding machine 10 is in the form of a row crop planter but may also be in the form of a grain drill, etc. FIGS. 1 and 2 illustrate a single row crop unit 12 of a multi-row planter, with each row crop unit 12 being substantially identical and connected to a common tool bar 14. Only a single row crop unit 12 is shown for simplicity sake.

Row crop unit 12 includes a multi-part frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a double disc furrow opener 20 for forming a seed trench in soil. A pair of gauge/closing wheels 22 are respectively associated with the pair of discs of double disc furrow opener 20. More particularly, each gauge/closing wheel 22 is positioned generally in line with and immediately adjacent to the outside of each respective disc of double disc furrow opener 20. Gauge/closing wheels 22 are pivotally coupled with frame 16 by respective arms 24. Each gauge/closing wheel 26 may be vertically adjusted to adjust the depth of the trench which is cut into the soil using double disc furrow opener 20.

A pair of closing wheels 26 are also carried by frame 16. Closing wheels 26 are positioned generally in line with double disc furrow opener 20.

Referring now to FIG. 2, each row crop unit 12 of seeding machine 10 carries a seed metering system 28 and a seed placement system 30. Seed metering system 28 includes an inlet chute 32 which receives seed from a main seed supply, such as a seed hopper carried above frame 16. Alternatively, seed may be stored in a distant main seed hopper and supplied to inlet chute 32 via air or the like.

Seed metering system 28 also includes a drive wheel 34 which drives a seed disc 36 having a plurality of seed cells 38 intermittently spaced about the periphery thereof. A coupler 39 is fluidly coupled with a vacuum source (not shown) for applying vacuum pressure to seed cells 38 formed in seed disc 36. This vacuum pressure promotes entry of the seeds into seed cells 38 and maintains the seeds in place within seed cells 38. Seeds are transported from seed cells 38 to seed placement system 30.

Seed placement system 30 includes a seed slide 40 which directs seed at a predetermined rate into the seed trench formed by double disc furrow opener 20. Seed slide 40 has a width in a direction transverse to the seed trench which is less than the width of the seed trench.

Wheel 42 defining a seed velocity regulator has a circumferential periphery which is positioned at or closely adjacent to seed slide 40. Wheel 42 engages the seeds received at seed placement system 30 at the predetermined rate and accelerates the seeds to a speed substantially corresponding to the traveling speed of seeding machine 10 in travel direction 44. Wheel 42 and seed slide 40 co-act to discharge the seeds at a desired trajectory and velocity.

Side plates 46 attach to seed slide 40 and are positioned on either side of wheel 42. Side plates 46 and seed slide 40 together define a housing which partially surrounds wheel 42.

Figure 4:
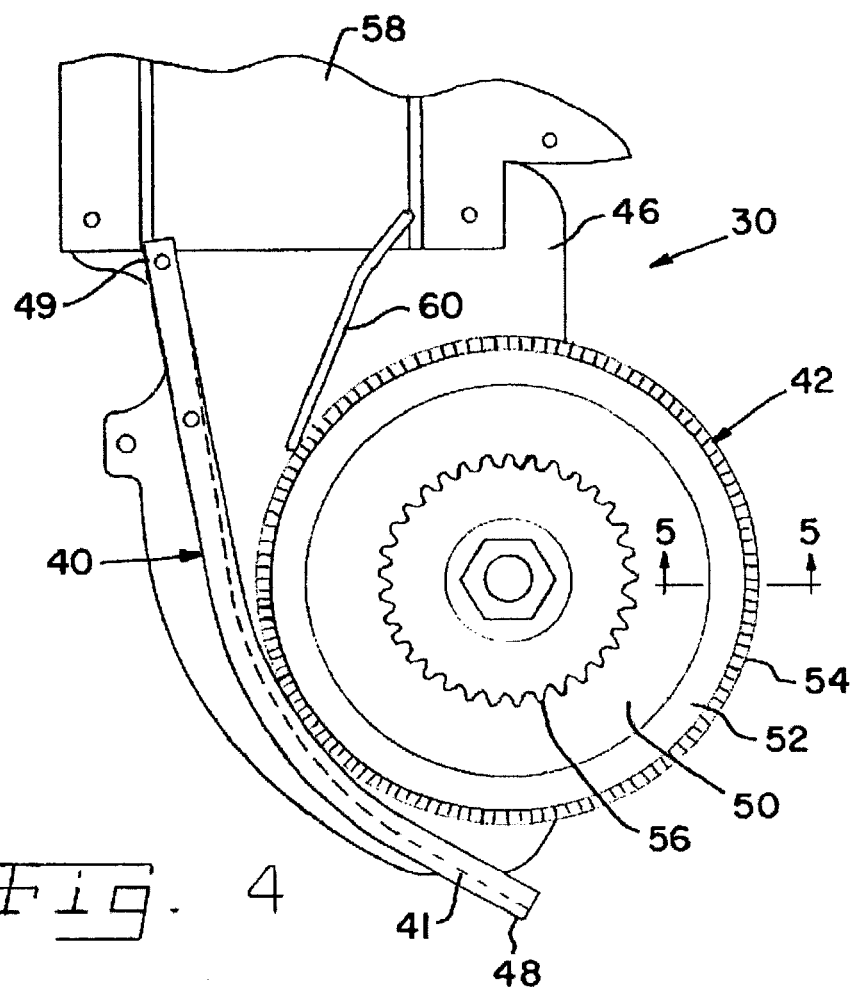
FIG. 4 is a side view of the seed placement system shown in FIGS. 2 and 3.
Figure 5:
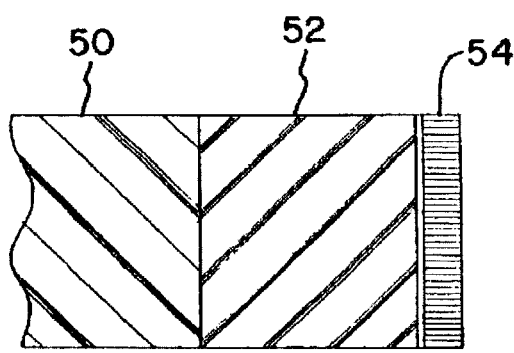
FIG. 5 is a sectional view of the wheel shown in FIG. 4, taken along line 5-5.

Referring now to FIGS. 4 and 5, seed placement system 30 will be described in greater detail. Wheel 42 defines a seed meter and accelerator which, together with seed slide 40, discharges seeds at a pre-determined rate from a bottom end 48 of seed slide 40. Wheel 42 generally includes a structural hub 50, a resilient middle layer 52 and a gripping outside layer 54. A driven sprocket 56 is ground driven via a chain (not shown) using suitable ground drive structure on the seeding machine. Alternatively, sprocket 56 may be driven using a hydraulic motor, electric motor, etc. Sprocket 56 is driven at a rotational speed causing a tangential velocity at the outside diameter of wheel 42 to generally match the forward speed of the seeding machine. Of course, wheel 42 may be driven at a different rotational speed depending upon the particular application.

Structural hub 50 is constructed of a suitable plastic providing structural support to wheel 52. The particular type of plastic which is used is selected to provide enough rigidity so that structural hub 50 is not deflected during normal use. Structural hub 50 may also be constructed from a different type of material such as metal or a composite, depending on the particular application. Structural hub 50 is generally disc shaped and provides structural support to each of resilient middle layer 52 and gripping outside layer 54.

Resilient middle layer 52 is positioned radially around structural hub 50. Resilient middle layer 52 has a generally rectangular cross-sectional configuration as shown in FIG. 5. Resilient middle layer 52 is constructed from a material allowing limited radially inward deflection to accommodate various sizes and orientations of seeds which pass between wheel 42 and seed slide 40. In the embodiment shown, resilient middle layer 52 is constructed from high density polyurethane foam having a density of between 15-20 pounds per cubic foot. This density of foam is believed to correspond to a shore durometer hardness rating of 30-40 (shore A). Foam having a shore durometer hardness rating of between 20-70 durometer may be used, depending on the particular application. Additionally, resilient middle layer 52 may be formed from rubber, expanded foam or other similar type resilient material.

Gripping outside layer 54 is positioned radially around resilient middle layer 52. Gripping outside layer 54 has a circumferential periphery defining an outside diameter of wheel 42. The circumferential periphery of gripping outside layer 54 is positioned closely adjacent to a portion of seed slide 40. More particularly, the circumferential periphery of gripping outside layer 54 is positioned at a distance of between 0 to 5 millimeters from a portion of seed slide 40. In the embodiment shown, the circumferential periphery of gripping outside layer 54 is positioned a distance of approximately 1 millimeter from seed slide 40.

Gripping outside layer 54 is formed with a circumferential periphery which has a plurality of contiguous disjoint surfaces. Regardless of the particular type of contiguous disjoint surface utilized, as will be described in more detail hereinafter, a high co-efficient of friction is provided which grips the seeds and carries the seeds at the pre-determined rate through the area between wheel 42 and seed slide 40 without excessively damaging the seeds. In the embodiment shown in FIGS. 4 and 5, the plurality of contiguous disjoint surfaces are in the form of a nylon bristle material made by 3M Corporation. The bristles are approximately 0.003 inch in diameter and approximately ⅛ inch in length. Depending upon the particular application, the material type, bristles length and bristle diameter may vary. For example, the bristles may range up to approximately one inch in length and up to approximately 0.024 inch in diameter. Furthermore, other types of materials having a high coefficient of friction may also be used such as a foam pad, expanded foam pad, mesh pad, fiber pad or a grit layer.

Seed slide 40 is formed with a seed trough 41 which increases in depth from top end 49 to bottom end 48. Seed trough 41 keeps the seed centered on seed slide 40 as it is carried by wheel 42 and also improves the trajectory at which the seed is discharged from bottom end 48 into the seed trench formed in the soil.

A deflector 60 is positioned below a discharge chute 58 extending from the bottom of seed metering system 28 towards seed placement system 30. Deflector 60 guides the seeds into the nip formed between wheel 42 and seed slide 40. Deflector 60 may also be configured to contact the plurality of bristles at gripping outside layer 54 of wheel 42. This local deflection of the bristles assists in positively moving the seed into the nip between wheel 42 and seed slide 40. In the embodiment shown, deflector 60 is in the form of a plate having a width corresponding to the width of wheel 42. However, deflector 60 may be differently configured.

During use, a selected seed type is received from a main seed supply at inlet chute 32 of seed metering system 28. The seed is maintained against a side of seed disc 36, which is driven by drive wheel 34 at a selected rotational speed using a mechanical drive, hydraulic motor, electric motor or other suitable drive. Seeds are received within seed cells 38 of seed disc 36. To assist seed movement into seed cells 38, a vacuum pressure is applied to the opposite side of seed disc 36 using a suitable vacuum source. Of course, a positive pressure may also be applied to the side of seed disc 36 at which the seeds are disposed. The seeds are discharged from seed metering system 28 at a predetermined rate through discharge chute 58. Deflector 60 assists in guiding the seeds into the nip area formed between wheel 42 and seed slide 40. Deflector 60 may also locally deflect the bristles of gripping outside layer 54 as it rotates therepast. Deflection of the bristles assists in gripping the seeds and carrying the seeds into the nip adjacent seed slide 40. The gap of approximately one millimeter between the circumferential periphery of wheel 42 and seed slide 40 ensures that the seed is gripped by gripping outside layer 54 without applying too much force against the seed. Resilient middle layer 52 also may be compressed depending upon the seed size and/or orientation as it travels in the area between wheel 42 and seed slide 40. Seed trough 41 continually increases in depth and maintains the seeds along the longitudinal axis of seed slide 40. The seed is accelerated to approximately match the ground speed of the seeding machine and is discharged from seed trough 41 at bottom end 48 into the seed trench formed in the soil. Gauge/closing wheels 22 and closing wheels 26 close the seed trench and thereby cover the seed in the trench.

Having described the preferred embodiment, it will become apparent that various modifications can be made without departing from the scope of the invention as defined in the accompanying claims.

The invention claimed is:

1. A seeding machine, comprising:
   at least one seed metering system; and
   at least one seed placement system, each said seed placement system being in communication with a corresponding said seed metering system, each said seed placement system including:
      a housing having a seed slide, said seed slide configured to guide a seed in a trajectory path, said seed slide having a concave shape in a direction along said trajectory path and a concave shape in a direction normal to said trajectory path; and
      a wheel at least partly disposed within said housing, said wheel having a circumferential periphery with a plurality of contiguous disjoint surfaces, said periphery being positioned adjacent at least part of said concave shapes of said seed slide.

2. The seeding machine of claim 1, wherein said seeding machine includes a plurality of row crop units, each said row crop unit including one said metering system and one said seed placement system.

3. The seeding machine of claim 1, further including a deflector positioned in association with said wheel for deflecting a portion of said plurality of contiguous disjoint surfaces at said wheel periphery.

4. The seeding machine of claim 3, wherein said deflector comprises a plate.

5. The seeding machine of claim 3, wherein said deflector is positioned at a predetermined location relative to said wheel periphery and deflects a portion of said plurality of disjoint surfaces upon rotation of said wheel.

6. A seeding machine, comprising:
   at least one seed metering system; and
   at least one seed placement system, each said seed placement system being in communication with a corresponding said seed metering system, each said seed placement system including:
      a housing having a seed slide said seed slide configured to guide a seed in a trajectory path, said seed slide having a concave shape in a direction along said trajectory path and a concave shape in a direction normal to said trajectory path; and
      a wheel at least partly disposed within said housing, said wheel having a circumferential periphery with a plurality of contiguous disjoint surfaces, said periphery being positioned adjacent at least part of said concave shapes of said seed slide, said wheel comprises a brush wheel, and said plurality of disjoint surfaces comprise a plurality of generally radially extending bristles at said periphery.

7. The seeding machine of claim 6, wherein said bristles are approximately ⅛ inch in length.

8. A seeding machine, comprising:
   at least one seed metering system; and
   at least one seed placement system, each said seed placement system being in communication with a corresponding said seed metering system, each said seed placement system including:
      a housing having a seed slide, said seed slide configured to guide a seed in a trajectory path, said seed slide having a concave shape in a direction along said trajectory path and a concave shape in a direction normal to said trajectory path; and a wheel at least partly disposed within said housing, said wheel having a circumferential periphery with a plurality of contiguous disjoint surfaces, said periphery being positioned adjacent at least part of said concave shapes of said seed slide, said wheel periphery comprises one of bristles, a foam pad, an expanded foam pad, a mesh pad, a fiber pad and a grit layer.

9. A seeding machine, comprising:

at least one seed metering system; and at least one seed placement system, each said seed placement system being in communication with a corresponding said seed metering system, each said seed placement system including:

a housing having a seed slide, said seed slide configured to guide a seed in a trajectory path with a concave surface in a direction along said trajectory path and a concave shape in a direction normal to said trajectory path; and a wheel at least partly disposed within said housing, said wheel having a circumferential periphery with a plurality of contiguous disjoint surfaces, said periphery being positioned adjacent at least part of said concave surface of said seed slide, said seed slide includes opposite sides, and said housing further includes a pair of side plates positioned on said opposite sides of said seed slide.

10. A seed placement system for use in a seeding machine, comprising:

a seed slide configured to guide a seed in a trajectory path, said seed slide having a concave surface in a direction along said trajectory path and a concave shape in a direction normal to said trajectory path;

a wheel having a circumferential periphery with a plurality of contiguous disjoint surfaces, said periphery being positioned closely adjacent at least part of said concave surface of said seed slide; and a deflector positioned in association with said wheel for deflecting a portion of said plurality of disjoint surfaces at said wheel periphery.

11. The seed placement system of claim 10, wherein said deflector comprises a plate.

12. The seed placement system of claim 10, wherein said deflector is positioned at a predetermined location relative to said wheel periphery and deflects a portion of said plurality of disjoint surfaces upon rotation of said wheel.

13. A seed placement system for use in a seeding machine, comprising:

a seed slide configured to guide a seed in a trajectory path, said seed slide having a concave surface in a direction along said trajectory path and a concave shape in a direction normal to said trajectory path;

a wheel having a circumferential periphery with a plurality of contiguous disjoint surfaces, said periphery being positioned closely adjacent at least part of said concave surface of said seed slide, said wheel comprises a brush wheel, and said plurality of disjoint surfaces comprise a plurality of generally radially extending bristles at said periphery; and a deflector positioned in association with said wheel for deflecting a portion of said plurality of disjoint surfaces at said wheel periphery.

14. The seed placement system of claim 13, wherein said bristles are approximately ⅛ inch in length.

15. A seed placement system for use in a seeding machine, comprising:

a seed slide configured to guide a seed in a trajectory path, said seed slide having a concave surface in a direction along said trajectory path and a concave shape in a direction normal to said trajectory path;

a wheel having a circumferential periphery with a plurality of contiguous disjoint surfaces, said periphery being positioned closely adjacent at least part of said concave surface of said seed slide, said wheel periphery comprises one of bristles, a foam pad, an expanded foam pad, a mesh pad, a fiber pad and a grit layer; and a deflector positioned in association with said wheel for deflecting a portion of said plurality of disjoint surfaces at said wheel periphery.

16. A method of placing seeds with a seeding machine in a trench formed in soil, comprising the steps of:

receiving seeds at a predetermined rate at a seed placement system, said seed placement system including a seed slide, said seed slide configured to guide a seed in a trajectory path having a concave surface in a direction along said trajectory path and a concave shape in a direction normal to said trajectory path, and a wheel having a circumferential periphery positioned closely adjacent at least part of said seed slide;

engaging the seeds at the predetermined rate against said wheel periphery;

carrying the seeds past a closely adjacent area of said concave surface of said seed slide using said wheel periphery; and releasing the seeds from said wheel periphery.

17. The method of placing seeds of claim 16, including the step of providing said wheel periphery with a coefficient of friction sufficient to carry the seeds past said seed slide while maintaining a substantially constant position of the seeds on said periphery.

18. The method of placing seeds of claim 16, wherein said wheel comprises a brush wheel having a plurality of generally radially extending bristles at said periphery, and said carrying step is carried out using said brush wheel.

19. The method of placing seeds of claim 16, wherein said wheel periphery includes a plurality of disjoint surfaces, and including the further step of deflecting a portion of said plurality of disjoint surfaces at said wheel periphery upon rotation of said wheel with a deflector.

20. The method of placing seeds of claim 19, further including the step of positioning said deflector at a predetermined location relative to said wheel periphery.

21. The method of placing seeds of claim 20, wherein said deflector comprises a plate.

* * * * *